United States Patent [19]

Hearn

[11] Patent Number: 4,483,721

[45] Date of Patent: Nov. 20, 1984

[54] METHOD AND APPARATUS FOR CUTTING PATTERNS THROUGH PIPE

[75] Inventor: David D. Hearn, Richardson, Tex.

[73] Assignee: Atlantic Richfield Company, Los Angeles, Calif.

[21] Appl. No.: 565,262

[22] Filed: Dec. 27, 1983

[51] Int. Cl.³ .............................................. B23K 7/04
[52] U.S. Cl. ...................................... 148/9.6; 266/55; 266/57
[58] Field of Search ..................... 148/9.6; 266/54, 55, 266/57

[56] References Cited

U.S. PATENT DOCUMENTS

| | | | |
|---|---|---|---|
| 2,865,625 | 12/1958 | Pauley | 266/55 |
| 3,398,804 | 8/1968 | Holbert | 175/61 |
| 3,552,731 | 1/1971 | Selkirk | 148/9.6 |
| 3,572,668 | 3/1971 | LeBlanc | 266/55 |
| 4,162,383 | 7/1979 | Hamasaki | 266/55 |
| 4,384,901 | 5/1983 | Swoboda | 148/9.6 |
| 4,397,360 | 9/1983 | Schmidt | 175/61 |

Primary Examiner—W. Stallard
Attorney, Agent, or Firm—Drude Faulconer

[57] ABSTRACT

A method and apparatus for cutting a series of patterns spaced along the length of a tubular member (e.g. drill collar). A cutting torch is positioned and manuevered within the bore of the pipe so that all cutting is done in an inside-to-outside direction. All slag formed by the cutting action is blown away from the pipe and does not collect within the pipe bore as in previous cutting operations of this type. Further, since there is no cross-wash of the torch, there is no substantially no heat buildup in the pipe during cutting which allows proper preheating of the pipe thereby alleviating cold cuts in the pattern.

15 Claims, 3 Drawing Figures

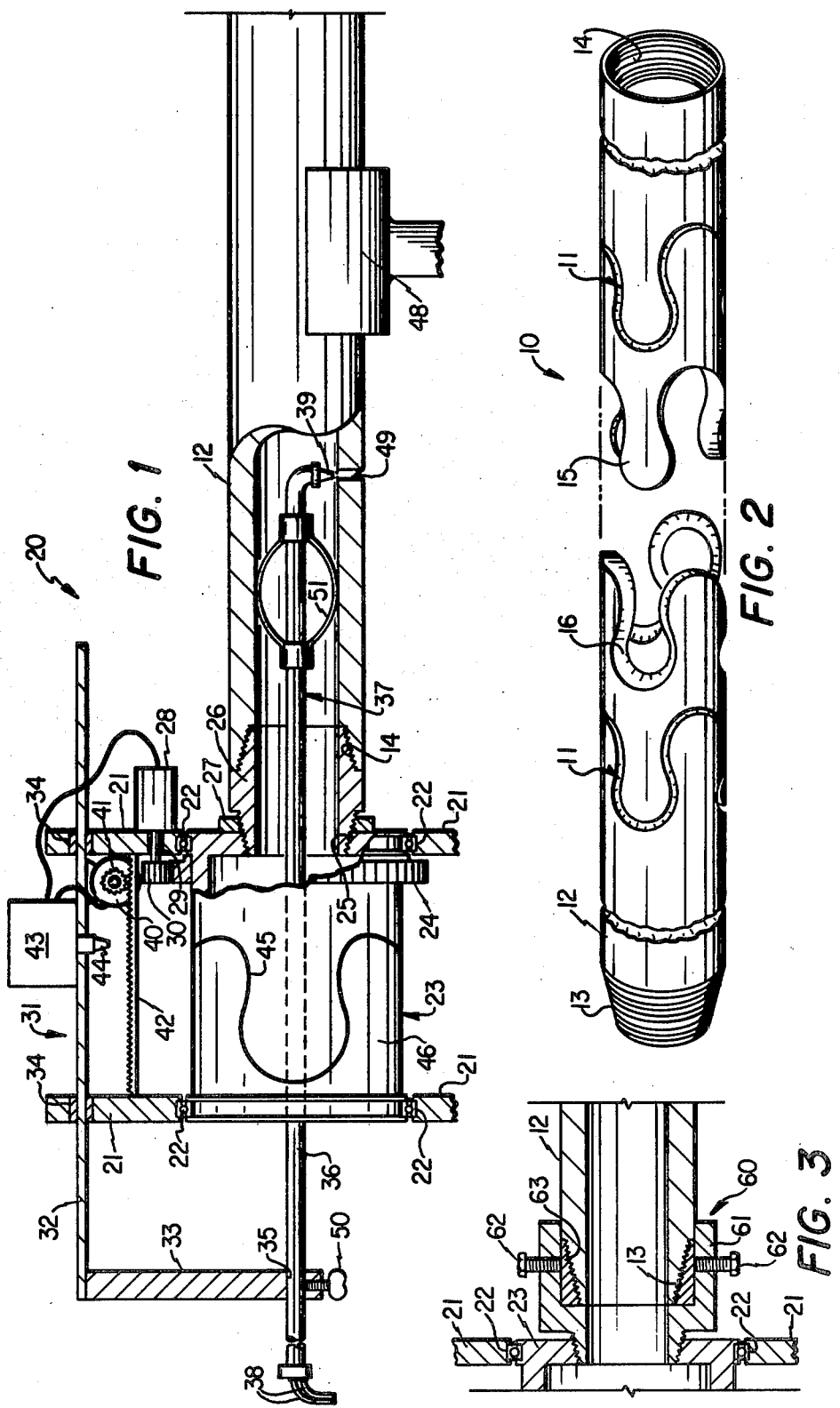

METHOD AND APPARATUS FOR CUTTING PATTERNS THROUGH PIPE

DESCRIPTION

1. Technical Field

The present invention relates to a method and apparatus for cutting a pattern through the wall of a tubular member and more particularly relates to a method and apparatus especially adaptable for cutting a pattern through the walls a pipe to form a flexible pipe section for use in a drill string or the like.

2. Background Art

In the production of hydrocarbons or the like from certain subterranean formations, a vertical wellbore is drilled down to the formation and then one or more "drain holes" or the like are drilled substantially horizontally outward from the wellbore into the formation. For examples of how such drilling operations are conducted, see U.S. Pat. Nos. 3,349,845; 3,398,804; and 4,397,360. In operations of this type, a flexible drill pipe section forms a part of the drill string which allows the drill bit and the lower portion of the drill string to be deflected towards a horizontal direction upon contacting a whipstock or the like in the wellbore.

Such flexible, drill pipe sections are routinely constructed by cutting a series of spaced cuts through the wall of a length of standard drill collar or the like. Each cut is patterned so that the adjacent portions of the cut pipe are inherently interlocked together in a manner to allow flexture therebetween while still maintaining a substantial portion of the original strength of the pipe. To achieve these requirements, the pattern angle and the smoothness of each cut must be closely controlled.

As far as is known, heretofore, all flexible, drill pipe sections of this type have been constructed by using techniques similar to or the same as those disclosed in U.S. Pat. No. 3,552,731. That is, a cutting tool, e.g. cutting torch, is moved in relation to the outside of the pipe to cut the desired pattern through the pipe. In U.S. Pat. No. 3,552,731, the pipe is cut by a machine having a pattern follower mechanism which maneuvers a cutting torch against the outside of the pipe to cut the desired pattern therein. However, in the cutting operation described in U.S. Pat. No. 3,552,731 as well as in all known modifications thereof, the cutting torch is always on the outside of the pipe and all cutting takes place in an outside-to-inside direction. As will become evident from the following discussion, this outside-to-inside cutting of the pipe results in problems so severe that in some cases, the pipe section being cut is unusable and has to be scrapped. These problems include (a) "cold cuts" in the pipe which result in uneven and jagged edges along the cut line; (b) accumulation of slag (i.e. material removed from the pipe as it is cut) in the bore of the pipe; and (c) erosion of the pipe bore wall due to excessive heat build-up and the oxygen-rich environment in the pipe.

As known, cold cuts can be alleviated by preheating the material to be cut before the actual cutting operation is commenced. For example, a pipe typically used to form a flexible drill pipe section should be preheated to a temperature in the 500°-700° F. range to prevent cold cuts from being formed in the patterned cut during the initial stages of the cutting operation. Unfortunately, however, it has been found that when the pipe is properly preheated and then cut in an outside-to-inside cutting direction, the temperature of the pipe becomes excessive during the latter stages of the cutting operation. This heat buildup in the pipe occurs as the torch flame breaks through the pipe wall being cut and impinges on the wall of the pipe bore lying opposite therefrom. The heat from this "cross-wash" of the torch flame is further intensified by any excess oxygen used in the cutting operation flowing through the cut and into the pipe bore as the torch flame breaks through the pipe.

The excessive temperature of the pipe during the latter stages of the cutting operation results in severe erosion of the pipe along and adjacent to the pattern line and substantially increase the problem of slag accumulation within the pipe bore. Slag is formed as material is removed from the pipe by the cutting action of the torch and is blown thereby into the pipe bore. If the temperature of the wall of the pipe bore is not too high, the slag which accumulates therein thereto can be rodded out satisfactorily. However, when the pipe bore is overheated, the slag is "welded" thereto and can not be readily removed by practical means. This results in the pipe section having to be scrapped which is both expensive and time-consuming.

As can be seen from the above, in previous known cutting operations of this type, it is difficult to properly preheat the pipe to alleviate cold cuts in the pattern during the initial cutting and, at the same time prevent undesirable excessive temperatures from building up in the pipe during the latter stages of the cutting operation.

DISCLOSURE OF THE INVENTION

The present invention provides a method and apparatus for cutting a complexed pattern through the wall of tubular member, e.g. pipe, at a controlled angle and with a high degree of smoothness throughout the entire length of the cut. The pipe is preheated to a temperature necessary to alleviate the problems of cold cuts in the pattern and the pipe is cut with an inside-to-outside direction which alleviates any substantial heat buildup in the pipe thereby alleviating the erosion and slag accumulation problems normally associated with cutting operations of this general type.

More specifically, the present invention involves the cutting of a pipe (e.g. a joint of drill pipe or the like) wherein a cutting torch is positioned and manuevered within the pipe bore and all cutting is done in an inside-to-outside direction. All slag formed by the cutting action is blown outward from the pipe instead of collecting in the pipe bore as in previously known operations. Further, since there is no cross wash of the torch flame or excess oxygen within the pipe bore, there is no substantial heat buildup in the pipe during the cutting operation. This allows the pipe to be preheated to the temperature necessary to alleviate cold cuts during the initial cutting stages without the risk of overheating the pipe during the latter stages of the operation.

Further in accordance with the present invention, an apparatus is provided which will automatically cut the pipe along the desired pattern at the controlled angle and degree of smoothness required. The apparatus is comprised of a support frame having a securingmeans, e.g. a cylindrical drum, rotatably mounted therein. The drum has a means thereon for releasably affixing the pipe thereto so that the pipe is rotated with the drum. The drum is rotated by a first controlled motor which is mounted on the support.

A carriage is slidably mounted for movement along a line parallel to the longitudinal axes of the drum and the pipe affixed thereto. A gear track, i.e. rack, is mounted in the support at a position spaced from the drum and lies parallel to the axis of said drum. A pinion gear, driven by a second controlled motor mounted on the carriage, cooperates with the rack to move the carriage back and forth along the rack. A cutting torch having a right-angled tip is adjustably connected to and is carried by the carriage. The torch extends through the drum into the bore of the pipe to be cut.

A pattern follower means is provided which sends signals in the proper sequence to both the first and second controlled motors to rotate the pipe and to move the torch in the relationship necessary to effect the patterned cut in the pipe. This pattern follower means may be any of several known means commonly used in pattern cutting, e.g. optical tracking means, magnetic tracking means, preprogrammable signal generators, (e.g. computer) mechanical translators, etc. In one disclosed modification, the control means comprises an optical sensor carried by the carriage which senses and tracks a replica of the pattern to be cut which, in turn, is laid out on the periphery of the drum. As the sensor follows the patterns replica, signals are generated by the pattern follower means which control the first and second controlled motors which, in turn, rotate the pipe and move the torch, respectively, to cut the desired pattern through the pipe wall.

In operation, the pipe to be cut is coupled to the drum and the torch is extended into and centered with the pipe bore so that the tip of the torch is positioned adjacent the starting point of the cut to be made. The torch is then locked to the carriage so that the torch will move therewith. The pipe is rotated with respect to the drum until the starting point of the tip is aligned with the starting point of the pattern on the drum and then the pipe is locked against further rotation with respect to the drum. The pipe is preheated to a desired temperature, e.g. 500°-700° F., and the cutting operation is commenced.

The pattern follower means generates and transmits signals to the first and second controlled motors in proper sequence to rotate the pipe and to move the torch within the pipe bore to effect the desired pattern cut in the pipe. When the pattern has been cut, operations are ceased and the torch is moved to another location within the pipe bore. The operation is then repeated until all cuts are completed.

BRIEF DESCRIPTION OF THE DRAWINGS

The actual construction, operation, and apparent advantages of the present invention will be better understood by referring to the drawings in which like numerals identify like part and in which:

FIG. 1 is a view, partly in section, of the pipe cutting apparatus of the present invention;

FIG. 2 is a partially exploded view of a flexible drill pipe section formed in accordance with the present invention; and FIG. 3 is a sectional view of another means that can be used to secured a pipe in the apparatus of FIG. 1.

BEST MODE FOR CARRYING OUT THE INVENTION

Referring more particularly to the drawings, FIG. 2 discloses a flexible, drill pipe section 10 (e.g. a wiggly) of the type commonly used in drilling horizontal bore holes (e.g. drain holes) in subterranean formations. Section 10 is routinely formed by cutting a series of patterned cuts 11 at spaced intervals along the length of a joint 12 (30 feet long) of standard drill pipe or the like which has a threaded pin 13 and threaded box 14, respectively, at the ends thereof. As understood in the art, each of the patterns 11 is cut through the wall of pipe 12 so that interlocking lobes 15 and sockets 16 are formed which inherently secure the adjacent cut portions together but which allow section 10 to achieve a high degree of flex while maintaining a substantial portion of the pipe joint's original strength.

Referring now to FIG. 2, the apparatus 20 of the present invention is disclosed by which the flexible drill pipe section 10 of FIG. 1 or the like is formed. Apparatus 20 is comprised a support frame 21, shown broken away in FIG. 2. For the sake of clarity, only those portions of support 21 are shown which are pertinent to the understanding of the present invention. Support 21 includes legs or the like (not shown) which rest on and support apparatus 20 on the floor of a work area. Rotatably mounted within support 21 by bearings 22 or the like is securing means, e.g. hollow, cylindrical drum 23, which, in turn, has a ring gear 24 affixed about the periphery thereof.

As illustrated, one end of drum 23 has a treaded opening 25 therein adapted to receive either pin 13 of pipe 12 (FIG. 1) or, as shown, threaded adapter 26 which, in turn, is adapted to be connected to box 14 of pipe 12, depending on which end of pipe 12 is to be connected to drum 23. A locking collar 27 is shown threaded on adapter 26 for a purpose described later. A first controlled motor 28 is mounted on support 21 and has a shaft 29 journaled through support 21. Gear 30 is mounted on shaft 29 and cooperates with ring gear 24 to rotate drum 23 when motor 28 is actuated.

Carriage 31 is comprised of an elongated member 32 or the like having an arm 33 affixed thereto. Member 32 is slidably mounted in support 21 by means of linear bearings 34 or the like. Arm 33 has an opening 35 therethrough adapted to receive the rigid lance portion 36 of cutting torch 37, e.g. acetylene torch. Individual gas conduits (not shown) are connected to the required gas supplies (e.g. acetylene, oxygen) by hoses 38 and extended through the interior of lance 36 to right-angled cutting tip 39 where the gasses are mixed for cutting as understood in the cutting art.

A second controlled motor 40 is mounted on member 32 and drives pinion gear 41 which cooperates with geartrack, e.g. rack 42, mounted in support 21. Rack 42 is positioned above drum 23 and lies along a line parallel to the axis of drum 23 and affixed pipe 12. It can be seen that carriage 31 will be moved back and forth along rack 42 when motor 40 is actuated.

Pattern follower means 43, illustrated as an optical sensing unit, e.g. Model LCT 30; coordinate Drive Tracer Unit, distributed by Steward-Warner Electronics, Chicago, Ill. (unit comes with motors 28, 40) is mounted on carriage 31 and has a sensor 44, e.g. an electric eye, which senses pattern 45 on drum 23. Pattern 45 is comprised of a heavy black line which is preferably laid out on a sheet of flexible material 46, e.g. paper, plastic, or the like, which, in turn, is removable secured around drum 23, e.g. by tape or the like. As understood in the art, sensor 44 tracks pattern 45 and generates the signals necessary to control motors 28, 40, respectively, in the proscribed sequence necessary to properly rotate drum 23 and move torch 39 to thereby cut pattern 43 into pipe 12.

Although pattern follower means 43 has been illustrated as being an optical sensing unit, it should be understood that means 43 can be comprised of other means known in the art for accomplishing this function. For example, pattern 45 may be formed of magnetic material on a sheet of non-magnetic material which, in turn, is mounted on drum 23 in which case means 43 is comprised of a magnetic sensing means which, in turn, generates the necessary control signals. Further, pattern follower means 43 may be mechanical in nature wherein drum 23 and carriage 32 are driven by a mechanical drive; see U.S. Pat. No. 3,552,731 which is incorporated herein in its entirety by reference. Further, pattern control means 43 may compromise a computer which has been programmed to output signals to motors 28, 40 in proper sequence to effect the desired pattern.

In operation, of the illustrated embodiment, drum 23 is rotated until the starting point of pattern 45 lies directly below sensor 44. Pipe 12 is then coupled to drum 23 and is supported by one or more cradle supports 48 or the like spaced along its length. As shown, box end 14 of pipe 12 is threaded onto adapter 26 which, in turn, is threaded into drum 23. After this connection is snugged up, the adapter and attached pipe is rotated until starting hole 49 in pipe 12 is vertically positioned on the downside of the pipe as shown in FIG. 1. Lock collar 27 is then tightened to lock pipe 12 and adapter 26 against any further relative rotation with respect to drum 23.

An alternate means 60 for securing pipe 12 to drum 23 is shown in FIG. 3. Collar 61 having one or more set screws 62 therein is screwed or otherwise affixed to drum 23. Box end 14 can be directly affixed in collar 61 by set screws 61. As shown, pin end 13 of pipe 12 is affixed within securing means 60 after thread protector 63 is screwed onto pin end 13. Pipe 12 is rotated within collar 60 to properly align start hole 49 in pipe 12 with the start point of pattern 45 on drum 23, similarly as described above before set screws 62 are tightened. Also, other means, in addition to those shown, can be used to secure pipe 12 to drum 23, e.g. releasable collet connections, etc., without departing from the present invention.

Lance 36 of torch 37 is moved through opening 35 in arm 33 to extend same into the bore of pipe 12 until cutting tip 39 is positioned directly downward over starting hole 49. Torch 37 is then locked in this position to carriage 31 by set screw 50 or the like. Torch 37 is maintained in a centered position within the pipe bore by one or more spring centralizers 51 or equivalents spaced along the length of lance 36. Pipe 12 is preferably preheated to a temperature (e.g. 500°–700° F.) and the cutting operation is then commenced with tip 39 cutting in a downward, inside-to-outside direction. The slag from the cut will be blown downward into a sandbox or the like as it is formed. As sensor 44 tracks pattern 45, control means 43 generates signals to motors 28 and 40, to rotate drum 23 and to move tip 39 horizontally within the pipe to cut pipe 12 in a pattern corresponding to pattern 45. By cutting the pipe in an inside-to-outside direction, it can be seen that the flame from tip 39 never impinges on the pipe bore except at the cutting point. Also, any excess oxygen that may be used is carried through the cut and is vented from pipe 12. After pattern 45 is completed, the operation is ceased, set screw 50 is loose, and tip 39 is moved to another starting hole (not shown) in pipe 12 which is spaced from hole 49. Set screw 50 is again tightened and the cutting operation is repeated. This operation is repeated until all of the desired spaced patterns are cut in pipe 12.

All of the patterns along a joint of pipe can be cut from the same end of the pipe but due to length of a typical pipe joint (e.g. 30 feet), it is preferred to cut half of the patterns through one end and then reverse the pipe and cut the other half of the patterns through the opposite end. This allows a shorter length of lance 35 to be used which is easier to accurately control. As shown in FIG. 1, to begin operations, lance 35 will be moved inward in pipe 12 to position tip 39 over a start hole which lies near midlength of pipe 12. After cutting the pattern at that location, lance 35 will be sequentially withdrawn to cut the remaining patterns toward box end 14. Operations are ceased and box end 14 and adapter 26 are unscrewed from drum 23. Pin end, with lock collar 27 thereon, is threaded into opening 25 of drum 23, aligned, and locked therein by collar 27. The sheet of material 46 on which pattern is inscribed 45 is reversed on drum 23 and the remaining patterns are cut in the same manner as described above. This allows all patterns in a finished section to lie in the same direction. Where a preprogrammed sequencer (i.e. computer) comprises program control means 43, two programs will be required, one for cutting patterns from one end of pipe 12 and the other for cutting patterns from the opposite end.

What is claimed is:

1. A method for cutting a pattern in a tubular member, said method comprising:
   positioning a cutting torch within the bore of said tubular member so that the tip of said cutting torch lies adjacent the starting point of said pattern to be cut;
   rotating said tubular member; and
   moving said torch within said bore of said tubular member in proper sequence with said rotation of said tubular member to thereby cut said pattern therein.

2. The method of claim 1 including:
   preheating said tubular member to a temperature necessary to prevent cold cuts in said pattern as said pattern is cut in said tubular member.

3. The method of claim 2 wherein said tubular member comprises:
   a length of drill collar of the type used in drilling earth wells;
   and wherein said preheat temperature is in the 500°–700° range.

4. The method of claim 3 wherein said pattern when cut through the wall of said tubular member comprises:
   a plurality of interlocking lobes and sockets through the wall of said tubular member whereby adjacent portions of said cut tubular member may move in a flexing movement relative to each other.

5. A method for cutting a series of patterns spaced along the length of a tubular member, said method comprising:
   positioning a cutting torch within the bore of said tubular member so that the tip of said cutting torch lies adjacent the starting point of the first of said patterns to be cut;
   manuevering said torch within said bore of said tubular member along a line corresponding to said pattern to thereby cut said first pattern through said tubular member in an inside-to-outside direction;

moving said torch within the bore of said tubular member until said tip of said torch lies adjacent the starting point of the second of said patterns;

manuevering said torch within said bore of said tubular member along a line corresponding to the said second pattern to thereby cut said second pattern through said tubular member in an inside-to-outside direction; and repeating the above steps until all of said series of patterns are cut.

6. An apparatus for cutting a pattern in a tubular member comprising:

a support;

securing means rotatably mounted in said support and adapted to be affixed to the tubular member to be cut so that the tubular member will rotate with said securing means when said tubular member is affixed thereto;

a carriage movably mounted on said support;

a cutting torch having an elongated lance with a right-angled tip thereon, said lance being of a length sufficient to extend said tip of said torch into the bore of the tubular member to the starting point of the pattern to be cut;

means for securing said lance of said torch to said carriage so said cutting torch will be moved by movement of said carriage;

pattern follower means for generating signals representative of said pattern to be cut;

means responsive to said signal generated by said pattern follower means for rotating said securing means; and means responsive to said signals generated by said pattern follower means for moving said carriage whereby said torch is moved within the bore of said tubular member.

7. The apparatus of claim 6 including:

means for centering said lance of said cutting torch in the bore of the tubular member.

8. The apparatus of claim 7 wherein said securing means comprises:

a drum rotatably mounted in said support;

means on said drum adapted for releasably securing said tubular member to said drum for rotational movement therewith.

9. The apparatus of claim 7 wherein said means for releasably securing said tubular member to said drum comprises:

a threaded opening in said drum adapted to receive a pin end of said tubular member.

10. The apparatus of claim 7 wherein the means for releasably securing said tubular member to said drum comprises:

an opening in said drum; and an adapter secured in said opening and adapted to be secured to a box end of said tubular member.

11. The apparatus of claim 8 wherein the means for releasably securing said tubular member to said drum comprises:

a collar affixed to said drum and adapated to receive one end of said tubular member; and means for releasably securing said tubular member within said collar.

12. The apparatus of claim 8 wherein said for rotating said securing means comprises:

a first gear on said drum;

a second gear cooperating with said first gear; and a first controlled motor responsive to said signals from said pattern follower means mounted on said support for driving said second gear.

13. The apparatus of claim 11 wherein said means for moving said carriage comprises:

a geared track on said support;

a pinion gear cooperating with said geared track; and a second controlled motor responsive to said signals from said pattern follower means mounted on said carriage for driving said pinion gear.

14. The apparatus of claim 12 wherein said pattern follower means comprises:

a programmed computer.

15. The apparatus of claim 12 wherein said pattern follower means comprises:

a replica of said pattern inscribed on the surface of said drum;

means on said carriage for sensing and following said replica on said drum and generating signals representative thereof.

* * * * *